United States Patent [19]

Kuge et al.

[11] Patent Number: 5,212,811
[45] Date of Patent: May 18, 1993

[54] RADIO TELEPHONE IN WHICH AN OFF OPERATION OF AN OPERATOR-ACTIVATED POWER SWITCH IS INHIBITED DURING A TALK MODE

[75] Inventors: Toru Kuge, Hino; Takaaki Ishii, Sagamihara, both of Japan

[73] Assignee: Kabushiki Kaisha Toshiba, Kawasaki, Japan

[21] Appl. No.: 446,540

[22] Filed: Dec. 5, 1989

[30] Foreign Application Priority Data

Dec. 7, 1988 [JP] Japan ............................... 63-309578
Mar. 10, 1989 [JP] Japan .................................... 1-59247

[51] Int. Cl.$^5$ ............................................. H04B 1/38
[52] U.S. Cl. ...................................... 455/73; 455/89; 455/343; 455/127; 379/61
[58] Field of Search ................... 455/58, 78, 79, 127, 455/212, 219, 343, 89, 73; 379/61-62, 201

[56] References Cited

U.S. PATENT DOCUMENTS

| | | | |
|---|---|---|---|
| 4,513,446 | 4/1985 | Leslie | 455/73 |
| 4,663,765 | 5/1987 | Sutphin et al. | 455/38 |
| 4,726,052 | 2/1988 | Kato et al. | 455/127 |
| 4,788,720 | 11/1988 | Brennan et al. | 379/201 |
| 4,893,348 | 2/1990 | Andoh | 455/343 |
| 4,916,729 | 4/1990 | Usui | 455/127 |
| 4,945,570 | 7/1990 | Gerson et al. | 379/61 |

FOREIGN PATENT DOCUMENTS 0130244 10/1980 Japan ................... 455/127

OTHER PUBLICATIONS

Dargent, Bob "Aurora System Lights the Way in Cellular Mobile Radio Market"; *Telephony,* Aug. 16, 1982.
English translation of Japanese Patent No. 55-130244 issued to Sugiyama.

*Primary Examiner*—Reinhard J. Eisenzopf
*Assistant Examiner*—Andrew Faile
*Attorney, Agent, or Firm*—Finnegan, Henderson, Farabow, Garrett & Dunner

[57] ABSTRACT

A radio telephone apparatus, such as a car telephone, and the method of controlling a radio telephone apparatus, in which the OFF operation of a power source switch caused by an erroneous operation is inhibited when the radio telephone is in a talk mode. In more detail, the ON or OFF state of the power source switch is detected as well as whether or not the apparatus is in the talk mode, so that the switching of a power source line switch to its OFF state by means of the power source switch is inhibited in the talk mode and allowed only in a non-talk mode. Further, an ON/OFF function of a power supply of the apparatus as well as, for example, a muting function which is necessary only in the talk mode and which acts to attenuate a transmission talk voice, are allocated to one of keys in a dial key pad. The ON or OFF state of the allocated function key is detected to perform muting control based on the ON or OFF output of the function key in the talk mode and to perform ON/OFF control of the apparatus power supply in the non-talk mode.

43 Claims, 7 Drawing Sheets

RADIO TELEPHONE IN WHICH AN OFF OPERATION OF AN OPERATOR-ACTIVATED POWER SWITCH IS INHIBITED DURING A TALK MODE

BACKGROUND OF THE INVENTION

1. Field of the Invention

The present invention relates to radio telephone apparatuses such as car telephones and methods of controlling them and, more particularly, to a radio telephone apparatus and the method of controlling it wherein the operation in which a power source switch is turned OFF by an erroneous operation in a talk mode is inhibited.

2. Description of the Related Art

A prior art radio telephone apparatus, for example, a car telephone comprises a transceiver unit and a control unit. The transceiver unit includes a power supply circuit for receiving power from a battery to generate necessary power source voltages, a controller, a radio circuit, an audio circuit, and a power source line switch provided between the battery and the power source part. The control unit includes a key pad through which a dial number or the like is input, a controller, a handset receiver, a handset transmitter, a loudspeaker for generation of a ringing tone, and a power source key input detecting circuit. The control unit is coupled to a party telephone set (an ordinary home telephone set or another car telephone) through an antenna, a radio circuit and a base station to form a talk path between the control unit and the party telephone set, so that a speech can be realized through the handset receiver and transmitter.

With the above arrangement, the power source switch for turning ON the power supply of the apparatus is separately provided from the key pad, but recently the power source switch is often arranged to be one key of the key pad. In the latter case, a certain key of the key pad is used as the power source switch so that continuous depression of this key for a predetermined period of time causes the power source key input detecting circuit to detect the depressed state of the key, whereby the power source line switch in the transceiver unit is turned ON. A second continuous depression of the key for the predetermined period of time causes the power source key input detecting circuit to detect the second depressed state of the key, whereby the power source line switch is turned OFF. In other words, each time the key, to which the power source switch function is allocated, is continuously depressed (turned ON) for the predetermined time, the power source line switch is alternately changed over from its ON state to its OFF state and vice versa.

Meanwhile, since the control unit is arranged to have the handset integrally built therein, the user must talk with the party holding the control unit in his or her hand in a talk mode. For this reason, the prior art apparatus has a problem in that it is possible for the user to erroneously touch the key allocated as the power source switch during the conversation with the other party, which undesirably results in the apparatus power supply being turned OFF and thus the speech path would be cut off.

Like the power source switch, a mute switch for interrupting a transmission voice at the call sender side to prevent the party from listening to the voice in the talk mode, a volume switch and other such switches are embodied respectively in the form of one key of the key pad.

In this way, in the case where keys of the key pad are arranged to be used as the power source switch, as the mute switch and as the volume switch, the controller in the transceiver unit periodically examines the ON or OFF state of each of the keys of the key pad and compares or collates the examined state with the previous ON or OFF state to determine which key has been operated. For example, if one of the keys having a mute function allocated thereto is operated, then the controller which controls the transmission talk muting switch is placed in its OFF state, thus cutting or deadening a transmission talk voice.

Meanwhile, it is common that about 6-9 function keys including the mute switch key are provided in a car telephone. With such an arrangement one function is allocated to one of the function keys of the key pad as mentioned above. However, when it is necessary to increase the number of function keys for the system to accommodate more functions, the physical size of the key pad must be disadvantageously restricted, as well as the number of allowable additional function keys, thus resulting in a system that cannot cope with the increase in the number of function keys. One of the measures taken to solve this problem is to enlarge the size of the key pad. However, this measure disadvantageously involves the increased size of the control unit containing the key pad.

SUMMARY OF THE INVENTION

It is an object of the present invention to provide a radio telephone apparatus which can prevent the unintentional turning ON of a power supply part and thus the cutting off of a speech path.

Another object of the present invention is to provide a radio telephone apparatus which can satisfy a demand of increasing the number of functions in the apparatus, while not increasing the number of keys in a key pad and also while not enlarging the size of the key pad.

The present invention is arranged to detect the ON or OFF state of a power source switch, detect whether or not the apparatus is in a talk mode, inhibit the switching of a power source line switch to its OFF state by means of the power source switch in the talk mode and allow the switching of the power source line switch only to the OFF state.

That is, even when the power source switch instructs the turning OFF of the power source line switch, this instruction will be invalidated and the power source line switch will not be turned OFF so long as the apparatus is in the talk mode. And when an instruction of turning OFF the power source line switch is issued from the power source switch in a non-talk mode, the power source line switch will be turned OFF.

The present invention is also characterized in that an ON/OFF function of an apparatus power supply as well as a function only necessary in the talk mode such as a mute function for attenuating a transmission talk voice are allocated to one of the keys in a dial key pad. The ON or OFF state of the above key is detected whether or not the apparatus is in the talk mode through a spatial radio circuit, so that an ON or OFF output of the above key causes the mute control to be carried out in the talk mode or causes the ON/OFF control of the apparatus power supply to be carried out in the non-talk mode.

When the apparatus is in the talk mode, the ON or OFF output of one of the keys in the key pad having both the ON/OFF function of the apparatus power supply and the mute function of attenuating a transmission talk voice, is used to perform the mute control in the talk mode, while to perform the ON/OFF control of the apparatus power supply in the non-talk mode.

DESCRIPTION OF THE PREFERRED EMBODIMENTS

Figure 1:
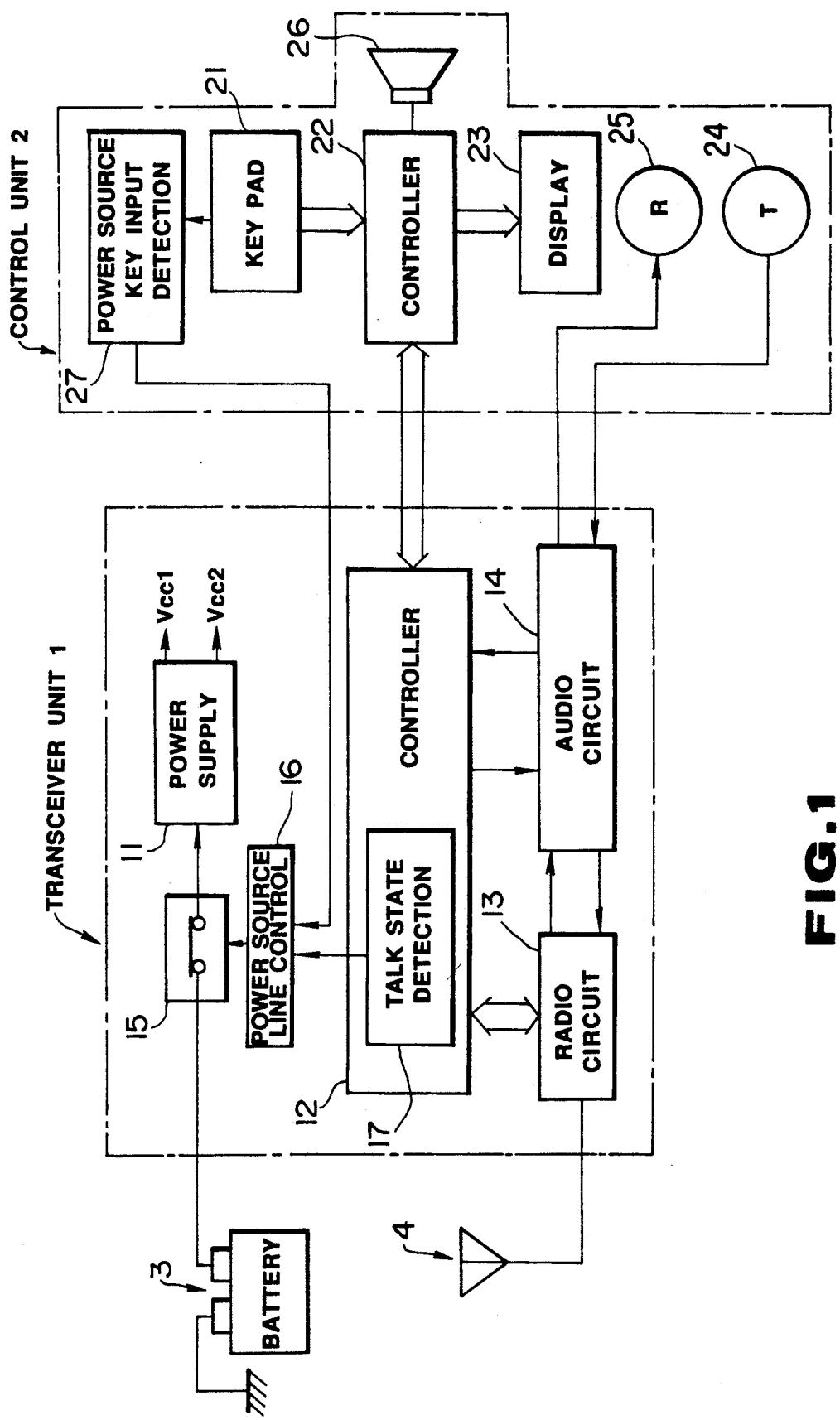
FIG. 1 is a block diagram showing an embodiment of the present invention.

Referring to FIG. 1, there is shown an embodiment of the present invention in which a car telephone is embodied as a radio telephone apparatus. The illustrated car telephone roughly comprises a transceiver unit 1 and a control unit 2. The transceiver unit 1 is installed, for example, within a trunk of a car, while the control unit 2 is installed, for example, by a driver's seat. More specifically, the transceiver unit 1 includes a power supply 11 for receiving power from a battery 3 to generate power source voltages $V_{CC1}$ and $V_{CC2}$ necessary in the transceiver 1 and the control unit 2, a controller 12 for controlling the operation of the overall transceiver unit 1, a radio circuit 13 for establishing a radio circuit with a base station (not shown), an audio circuit 14 for processing an audio signal received from the radio circuit 13 and an audio signal to be sent to the radio circuit 13, a power source line switch 15 provided between the battery 3 and the power supply 11 for cutting off the supply of power to the power supply 11, and a power source line control circuit 16 for controlling the turning ON and OFF operation of the power source line switch 15. The controller 12 has a talk state detection part 17 for detecting whether or not the car telephone is in a talk state.

The control unit 2, on the other hand, includes a key pad 21 through which a dial number or the like is input, a controller 22 for controlling the operation of the entire control unit 2, a talk receiver 25 for receiving a voice signal transmitted from the transceiver unit 1, a talk transmitter 24 for transmitting a voice signal to the transceiver unit 1, a loudspeaker 26 for generating a ringing tone, and a power source key input detecting circuit 27 for detecting the operation of a power source key.

The control unit 2 is coupled to the party telephone set (an ordinary home telephone set or another car telephone) through an antenna 4, a spatial radio circuit and a base station to form a talk path with the party telephone set, whereby a speech can be realized between the control unit 2 and the party telephone set through the talk receiver 25 and the talk transmitter 24.

The talk state detection part 17 in the controller 12 detects whether or not the car telephone is in the talk mode by detecting a supervisory audio tone from the base station.

Specifically, once a speech communication link using speech radio channels, which are changed over from control radio channels, are established between a car telephone and a base station, a supervisory audio tone signal is transmitted with speech signals from the base station over the speech radio channels. The supervisory audio tone signal has a predetermined frequency component and may be extracted from received signals in the radio circuit 13 by a filtering technique. When the supervisory audio tone is extracted, the radio circuit 13 applies a detection signal to the controller 12. Thus, the talk state detection part 17 in the controller may determine whether a speech communication link is established.

It should be noted that the talk state detection part 17 may detect that the car telephone is in the talk mode when the speech radio channels are established instead of detecting the supervisory audio signal.

One of keys in the key pad 21 is commonly used also as the power source switch for turning ON and OFF the power supply of the car telephone, so that, for example, when the user continuously depresses this key for a predetermined period of time, the power source key input detecting circuit 27 detects the depressed state of the key and sends a power source key operation signal to the power source line control circuit 16 in the transceiver unit 1.

Figure 2:
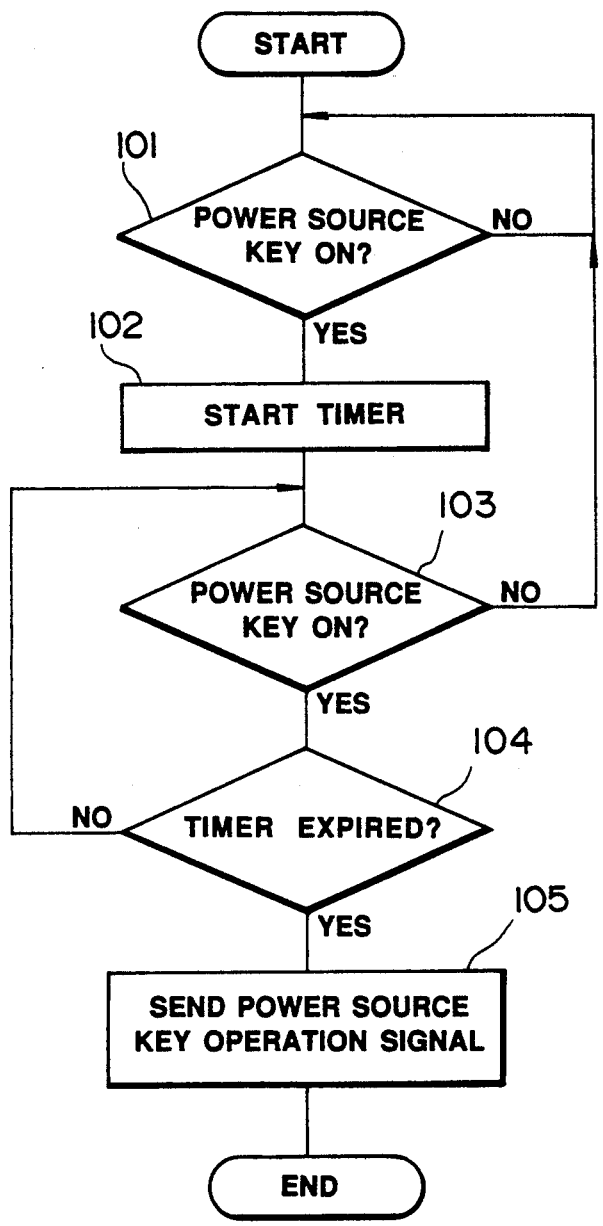
FIG. 2 is a flowchart showing the power source key input detecting operation of the embodiment shown in FIG. 1.

Shown in FIG. 2 is a flowchart for explaining an example of the power source key detecting operation of the power source key input detecting circuit 27. More in detail, when one of the keys (which will be referred to as the power source key, hereinafter) of the key pad 21 used as a power source key is turned ON (depressed) (step 101), a timer for detecting the expiration of a predetermined time period is started up (step 102). Subsequently, the detection circuit 27 checks whether or not the power source key is depressed (step 103) and whether or not the timer expires (times up) (step 104). If the depression of the power source key is continued until the timer expires, then the power source key input detection circuit 27 sends a power source key operation signal to the power source line control circuit 16 within the transceiver 1 (step 105).

The power source line control circuit 16 of the transceiver unit 1, when receiving the power source key operation signal from the power source key input detection circuit 27, examines, on the basis of an output received from the talk state detection part 17, whether or not the car telephone is communicating with another party. When the power line control circuit 16 determines that the car telephone is not communicating, i.e., detects a non-talk state of the talk state detection part 17, the power control circuit 16 responds to the received power source key operation signal and controls the turning ON/OFF operation of the power source line switch 15. More specifically, if the power source line switch 15 is in its OFF state, then the power line control circuit 16 turns On the power source line switch 15 in response to the power source key operation signal; while if the switch 15 is in its ON state, then the circuit 16 turns OFF the power source line switch 15 in response to the power source key operation signal.

When the power source line control circuit 16 detects the car telephone in the communication mode on the basis of the output of the talk state detection part 17, on the other hand, the circuit 16 will not respond to the power source key operation signal even if the power source key operation signal is provided to the circuit 16, and thus will not turn OFF the power source line switch 15.

Figure 3:
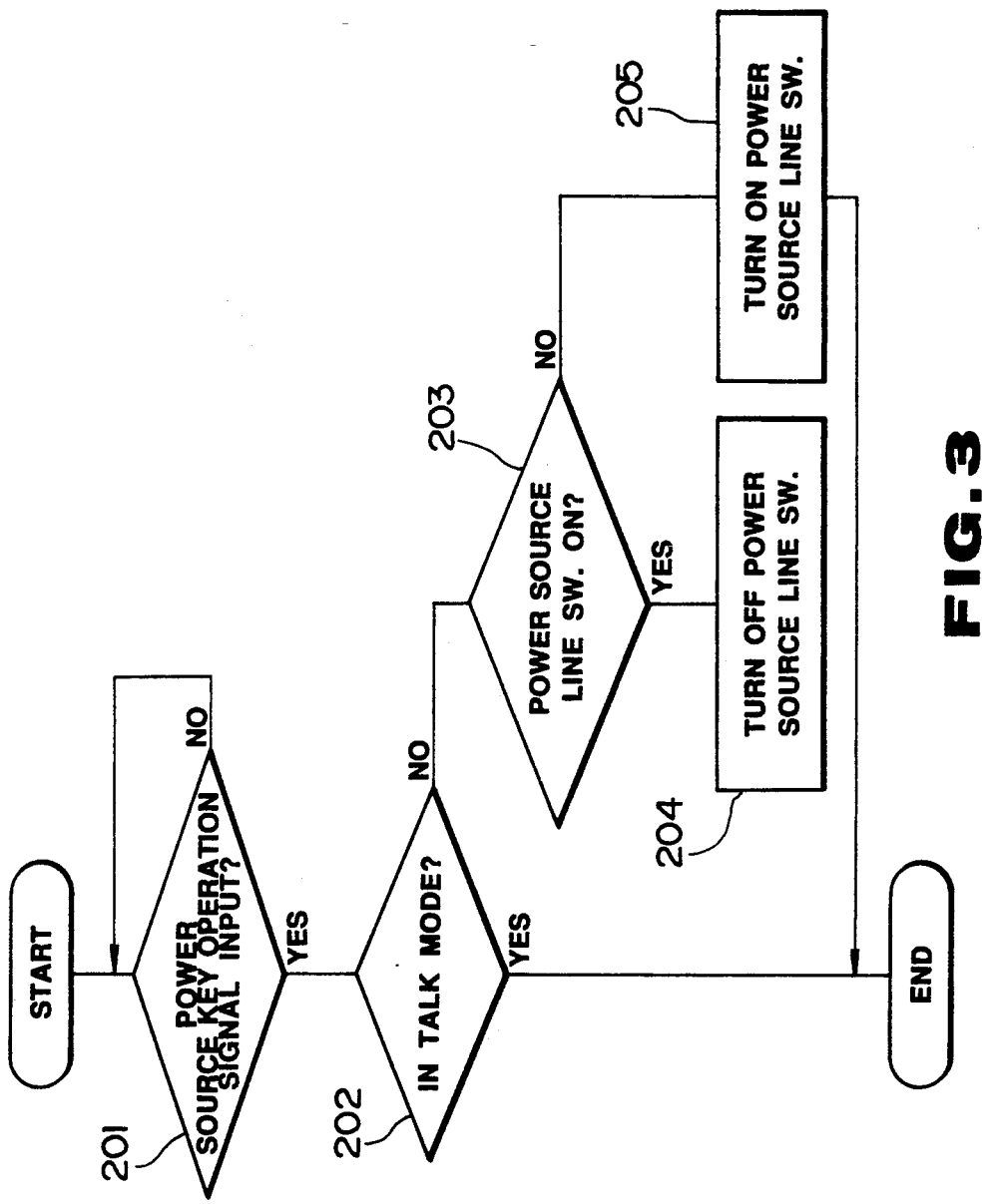
FIG. 3 is a flowchart showing the operation of a power source line control circuit in the embodiment of FIG. 1.

FIG. 3 shows a flowchart for explaining the operation of the power source line control circuit 16. More in detail, the circuit 16, when receiving the power source key operation signal from the power source key input detection circuit 27 (step 201), checks whether or not the car telephone is in the communication mode (step 202). When the power source line control circuit 16 determines the system not in the communication mode, then it examines whether or not the power source line switch 15 is in the ON state (step 203). If so, then the circuit 16 turns OFF the power source line switch 15 (step 204), while if not then the circuit 16 turns ON the switch 15 (step 204). When the car telephone is in the communication mode, however, the circuit 16 will not respond to the power source key operation signal and terminate this flow.

Thus, even when the user erroneously touches the power source switch key as one of the keys of the key pad 21 during the telephone communication, it can be avoided that the power supply of the car telephone is turned OFF and the talk path is cut off.

Although explanation has been made as to the case where one of the keys in the key pad 21 is commonly used also as the power source switch in the foregoing embodiment, the similar explanation may hold true for the case where a dedicated power source switch is integrally provided with the handset. Further, the transceiver unit 1 has been provided separately from the control unit 2, but the units 1 and 2 may be integrally combined to form a portable type with the small sized battery 3.

With such an arrangement, even if the power source switch is erroneously operated to instruct the turning OFF of the apparatus power supply, this OFF instruction can be invalidated so long as the apparatus is in the communication mode, thus enabling the avoidance of unintentional cutting off of the talk path during the apparatus communication.

Figure 4:
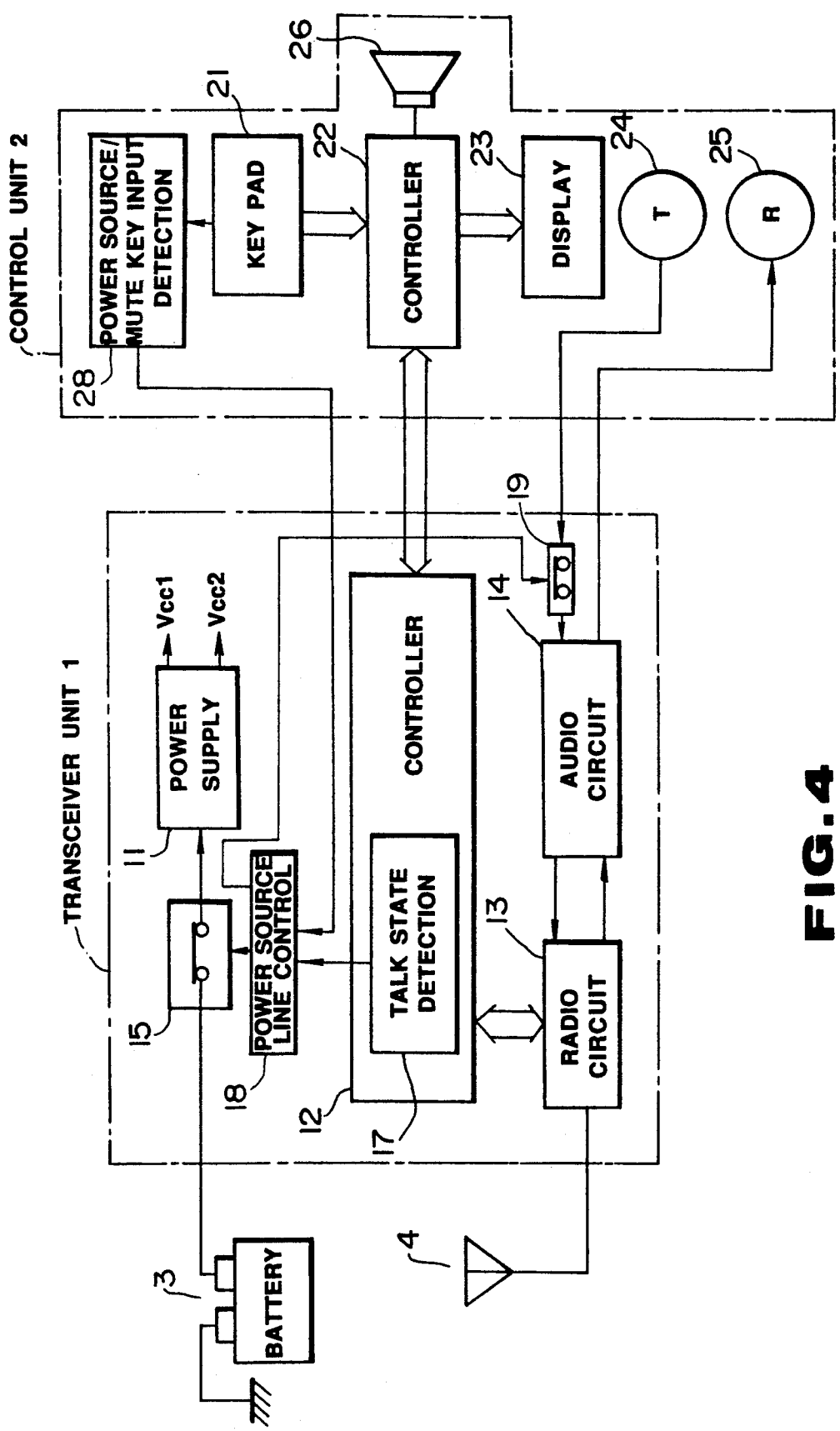
FIG. 4 is a block diagram showing another embodiment of the present invention.

There is shown in FIG. 4 a block diagram of another embodiment of the present invention, in which the same parts as those in FIG. 1 are denoted by the same reference numerals and explanation thereof is omitted. In the drawing, the transceiver unit 1 contains a mute switch 19 which cuts off or deadens a voice sent from the transmitter 24 of the control unit 2, while the control unit 2 contains a power source/mute key input detection circuit 28. The transceiver unit 1 further contains a power source line/mute control circuit 18 which turn ON or OFF the power source line switch 15 and the transmission talk muting switch 19 on the basis of output signals received from the two detection circuits, i.e., the talk state detection part 17 for detecting whether or not the apparatus is in the talk mode and the power source/mute key input detection circuit 28.

In the present embodiment, two functions of an ON/OFF function of the apparatus power supply and a mute function of deadening a transmission voice are allocated to one of the keys in the key pad 21, so that the power source/mute key input detection circuit 28, when detecting the operation (continuous depression for a time period exceeding the predetermined time) of the key having the aforementioned two functions, sends a power source/mute key operation signal to the power source line/mute control circuit 18 of the transceiver unit 1.

Figure 5:
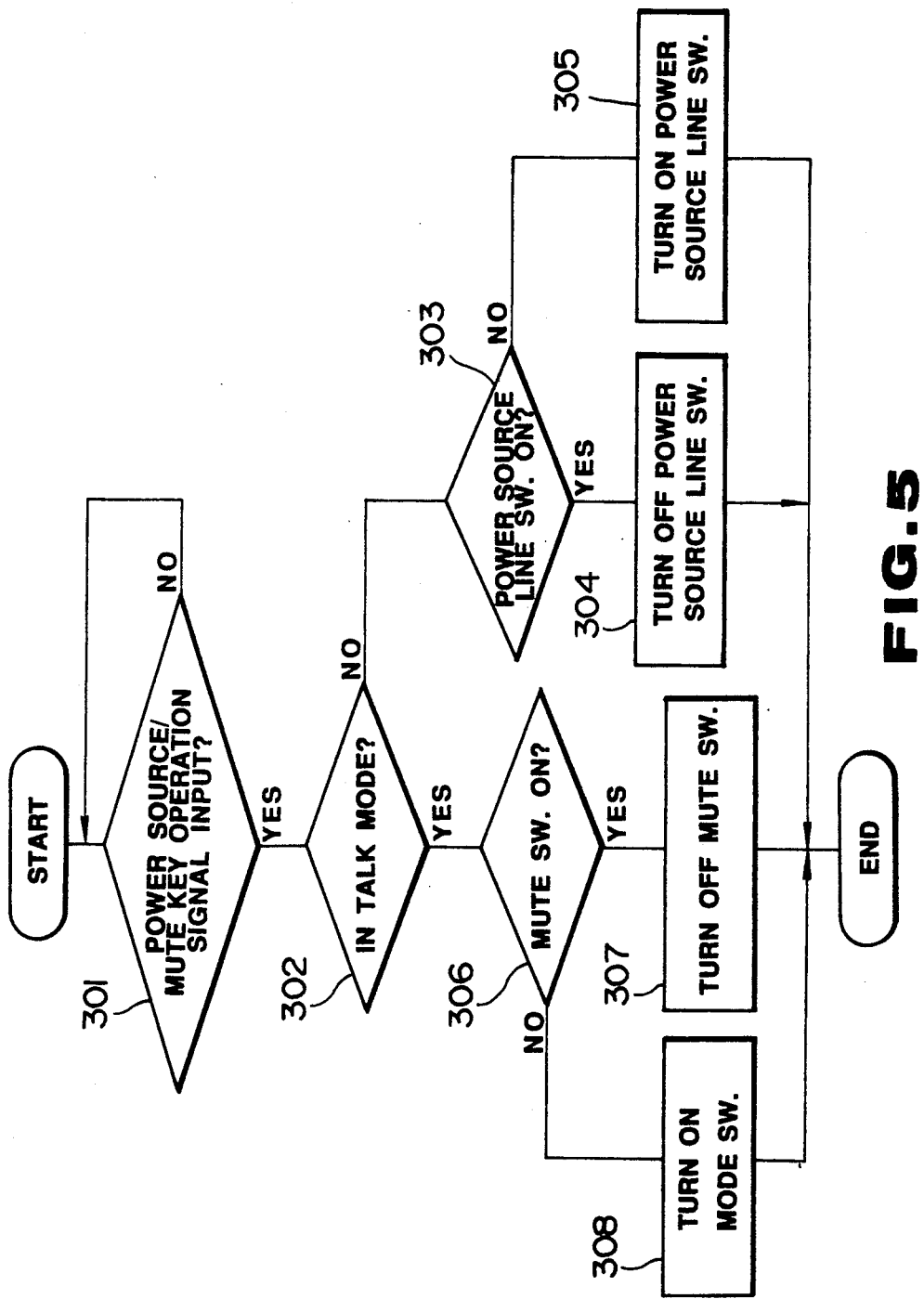
FIG. 5 is a flowchart showing the operation of a power source line/mute control circuit in the embodiment of FIG. 4.

With such an arrangement as mentioned above, the power source line/mute control circuit 18 operates as shown by a flowchart in FIG. 5. That is, when the circuit 18 receives the power source/mute key operation signal from the circuit 28 (step 301) and the talk state detection part 17 detects that the car telephone is in the non-talk state, the circuit 18 recognizes the aforementioned key of the key pad 21 as the ON/OFF function key of the telephone power supply and controls the ON and OFF operation of the power source line switch 15. More specifically, when the power source line switch 15 is in the ON state (step 303), the power source line/mute control circuit 18 responds to the power source/mute key operation signal received from the power source/mute key input detection circuit 28 and turns OFF the power source line switch 15 (step 304). When the power source line switch 15 is in the OFF state (step 303), the power source line/mute control circuit 18 responds to the power source/mute key operation signal received from the power source/mute key input detection circuit 28 and turns ON the power source line switch 15 (step 305).

When the talk state detection part 17 detects that the car telephone is in the talk mode, however, the power source line/mute control circuit 18 recognizes the aforementioned key of the key pad 21 as a talk voice muting key and controls the ON and OFF operation of the muting switch 19. More in detail, if the muting switch 19 is in the ON state (step 306), then the power source line/mute control circuit 18, responsive to the power source/mute key operation signal received from the power source/mute key input detection circuit 28, turns OFF the muting switch 19 (step 307); while if the muting switch 15 is in the OFF state (step 303), then the power source line/mute control circuit 18, responsive to the power source/mute key operation signal received from the power source/mute key input detection circuit 28, turns OFF the muting switch 19 (step 308).

That is, the function of turning ON and OFF the telephone power supply is unnecessary in the talk mode, while the mute function is unnecessary in the non-talk mode. Accordingly, when the two functions of the ON/OFF function of the telephone power supply and the mute function of deadening a transmission voice are allocated to one key as stated above and are selectively used depending on the talk or non-talk mode, the car telephone can realize the saving of the number of necessary function keys and also can satisfy a demand of increasing the number of necessary function keys. In addition, the ON/OFF function of the power supply becomes valid only when the car telephone is in the talk mode, so that even when the user erroneously touches the above function key in the talk mode, it can be avoided that the telephone power supply is unintentionally turned OFF and thus the talk path is cut off.

With the present arrangement, the ON/OFF function of the telephone power supply and the mute function of attenuating a transmission talk voice are allocated to one of the keys in the dial key pad, and there is provided a detecting means for detectin whether or not the car telephone is in the talk mode through the spatial radio circuit, so that mute control is carried out on the basis of the ON or OFF output of said key in the talk mode, while ON/OFF control of the telephone power supply is carried out in the non-talk mode. As a result, the car telephone can realize the saving of the number of necessary function keys and can satisfy a demand of increasing the number of necessary functions while not involving the increse of the number of keys in the key pad and the enlargement of the size of the key pad. In addition, since the ON/OFF function of the power supply becomes valid only in the non-talk mode, even erroneous depression of the above function key will cause the prevention of unintentional turning OFF of the telephone power supply and thus the cutting off of the talk path.

Figure 6:
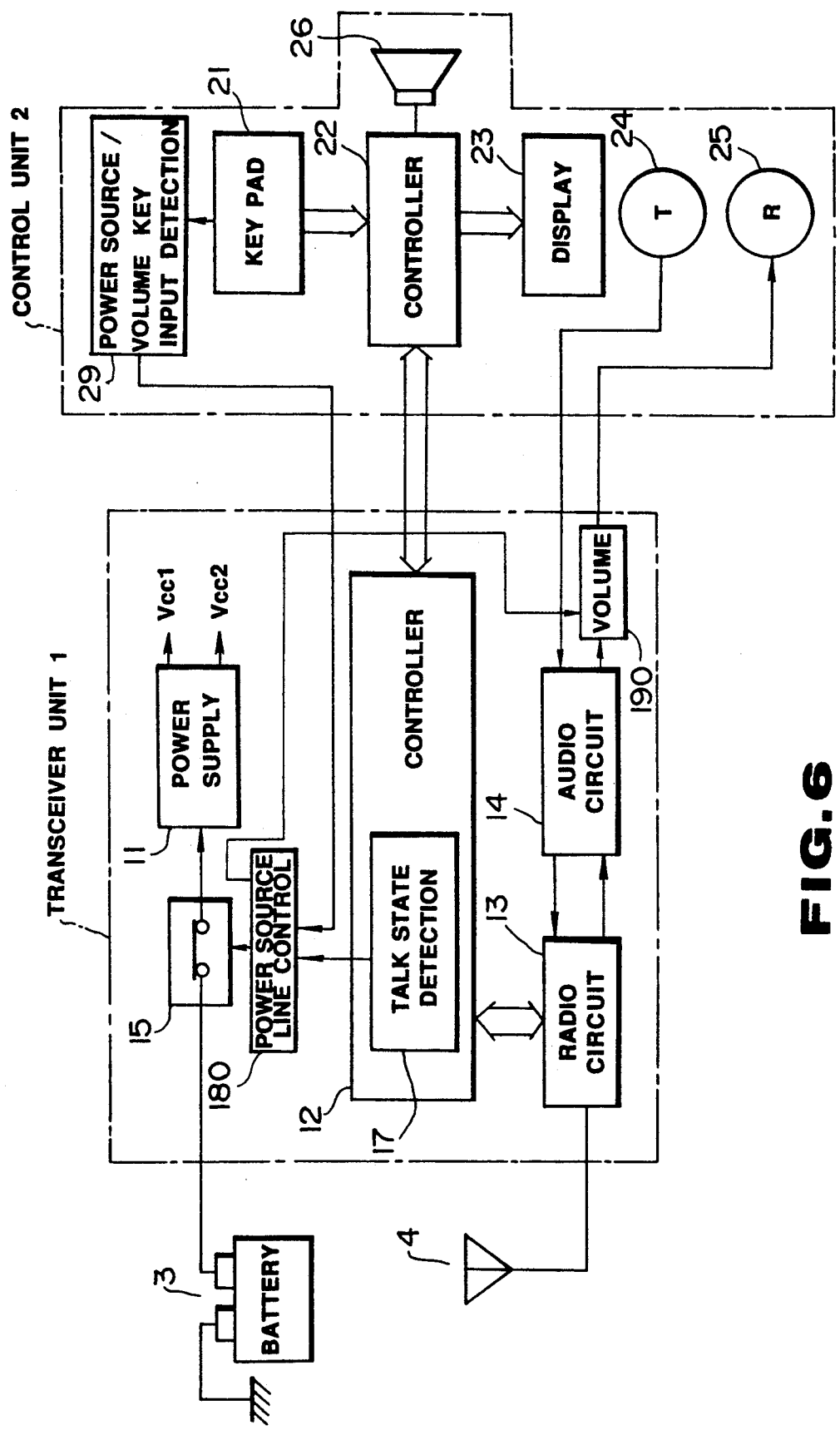
FIG. 6 is a block diagram showing a further embodiment of the present invention.

FIG. 6 shows a block diagram of a further embodiment of the present invention, in which embodiment the transceiver unit 1 contains a volume circuit 190 which controls the volume of a voice to be sent to the receiver 25 of the control unit 2 and the control unit 2 contains a power source/volume key input detection circuit 29. The transceiver unit 1 further contains a power source line/volume control circuit 180 which controls the ON and OFF operation of the power source line switch 15 and the volume circuit 190 on the basis of output signals received from the two detection circuits, i.e., the talk state detection part 17 for detecting whether or not the car telephone is in the talk state and the power source/volume key input detection circuit 29.

In the illustrated embodiment, the ON/OFF function of the telephone power supply and a volume function of controlling the volume of a received talk voice are allocated to one of keys in the key pad 21. When the power source/volume key input detection circuit 29 detects a depressed state of the above key to which the above two functions are allocated (continuous depression of the key for a time period exceeding a predetermined time), the circuit 29 sends a power source/volume key operation signal to the power source line/volume control circuit 180 in the transceiver unit 1.

Figure 7:
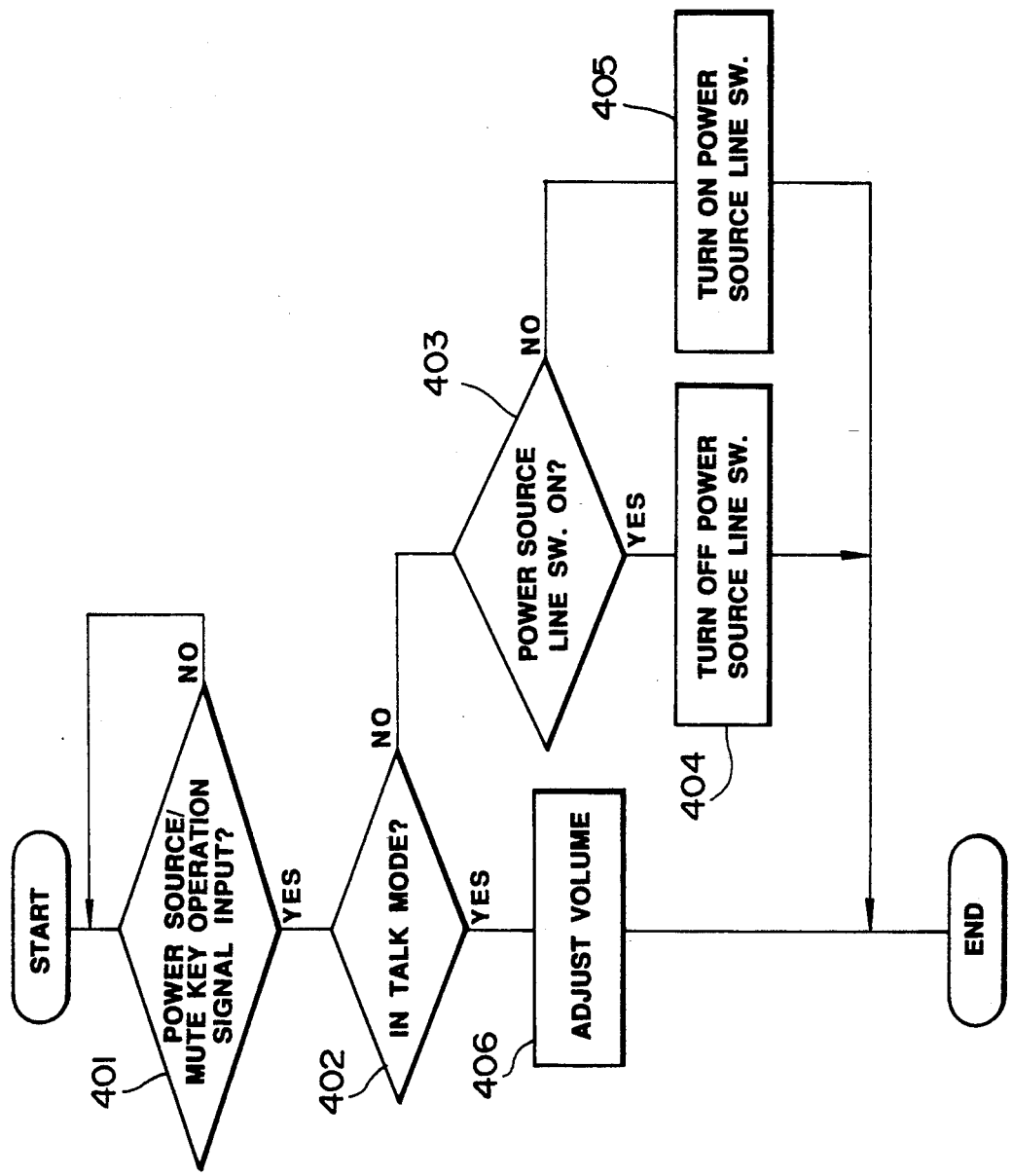
FIG. 7 is a flowchart showing the operation of a power source line/volume control circuit.

In such an arrangement as mentioned above, the power source line/volume control circuit 180 operates as shown by a flowchart in FIG. 7. More specifically, when the power source line/volume control circuit 180 receives the power source/volume key operation signal (step 401) and detects that the system is already in the non-talk mode on the basis of an output signal from the talk state detection part 17 (step 402), the circuit 180 recognizes the above key of the key pad 21 as the ON/OFF function key of the telephone power supply and controls the ON and OFF operation of the power source line switch 15. More in detail, if the power source line switch 15 is in its ON state (step 403), the the circuit 180 turns OFF the power source line switch 15 (step 404), while, if the power source line switch 15 is in its OFF state, then the circuit 180 turns ON the power source line switch 15 (step 405).

When the talk state detection part 17 detects that the car telephone is in the talk mode, however, the circuit 180 recognizes the above key of the key pad 21 as the volume key for controlling the volume of a received talk voice and controls the volume circuit 190. For example, responsive to the power source/volume key operation signal received from the power source/volume key input detection circuit 29, the power source line/volume control circuit 180 increases or decreases the volume of a received talk voice, which is repeated.

Even with such an arrangement as mentioned above, the radio apparatus can realize the saving of the number of necessary function keys and can meet a demand of increasing the number of necessary functions in the apparatus while not involving the increase of the number of necessary keys in the key pad and also while not involving the enlargement of the size of the key pad. Since the ON/OFF function of the power supply becomes valid only in the non-talk mode, even when the user erroneously touches the above function key during the apparatus conversation operation, it can be avoided that the apparatus power supply is unintentionally turned OFF and the talk path is cut off.

The function key commonly used also as the power source key is not limited to the mute and volume keys and other suitable function keys may be used instead only in the talk mode.

In the above described embodiments, although arrangements of a car telephone and its operation were explained in detail, it is apparent to those skilled in the art to apply the present invention to a cordless telephone, cellular portable telephone and so on. Still, the present invention may be applied to any radio telecommunication apparatus with a power ON/OFF switch.

What is claimed is:

1. A radio telephone apparatus comprising:
   a transceiver unit having a power supply and a radio circuit;
   a control unit having a receiver and a keypad;
   a power source key, included in said keypad, for turning ON and OFF said power supply, wherein said power supply is turned ON solely in response to an actuation of said power source key;
   talk state detection means, included in the transceiver unit, for detecting whether or not said apparatus is in a talk mode on the basis of the establishment of a speech radio channel by said radio circuit; and
   control means, included in the transceiver unit, for preventing said power supply from being turned OFF in response to a switching operation of said power source key when said talk state detection means detects that the apparatus is in said talk mode.

2. A radio telephone apparatus as set forth in claim 1, wherein said control means includes a power source line switch provided in a power supply line leading to said power supply and inhibit means for inhibiting OFF operation of said power source line switch when said talk state detection means detects that said apparatus is in the talk mode.

3. A method of controlling a radio telephone apparatus having a transceiver unit including a power supply and a radio circuit, said method comprising the steps of:
   turning ON said apparatus by operating an ON/OFF key, wherein said apparatus is turned ON solely in response to an actuation of said ON/OFF key;
   detecting whether or not said apparatus is in a talk mode on the basis of the detection of a supervisory audio tone signal transmitted by a base station; and
   inhibiting user-activated OFF operation of said power supply when the apparatus is in the talk mode.

4. A method as set forth in claim 3, wherein said inhibiting step is carried out by inhibiting OFF operation of a power source line switch disposed in a power supply line leading to said power supply.

5. A method as set forth in claim 3, further comprising a step of detecting whether or not a switching operation has been provided to turn OFF said power supply, and wherein said inhibit step is carried out by inhibiting OFF operation of said power supply so long as said apparatus is in the talk mode even when a switching operation has been provided to turn OFF the power supply.

6. A radio telephone apparatus comprising:
   a transceiver unit having a power supply and a radio circuit;
   a control unit having a receiver and a keypad;
   a power source key, included in said keypad, for turning ON and OFF said power supply, wherein said power supply is turned ON solely in response to an actuation of said power source key;
   talk state detection means, included in the transceiver unit, for detecting whether or not said apparatus is in a talk mode on the basis of the establishment of a speech radio channel by said radio circuit;
   a key operation state detection circuit, included in the control unit, for detecting whether or not said power source key has been operated; and
   control means, included in the transceiver unit, for controllably turning OFF said power supply when said talk state detection means fails to detect that said apparatus is in the talk mode and when said key operation state detection circuit detects that the power source key has been operated, and for controllably inhibiting OFF operation of the power supply when both said talk state detection means detects that said apparatus is in the talk mode and said key operation state detection circuit detects that the power source key has been operated.

7. A radio telephone apparatus as set forth in claim 6, wherein said control means includes a power source line switch provided in a power supply line leading to said power supply and inhibit means for inhibiting OFF operation of said power source line switch when said talk state detection means detects that said apparatus is in the talk mode.

8. A radio telephone apparatus as set forth in claim 6, wherein said control means executes a muting operation when said talk state detection means detects that said apparatus is in the talk mode and when said key operation state detection circuit detects that said power source key has been operated.

9. A radio telephone apparatus as set forth in claim 6, wherein said control means executes a volume adjusting operation when said talk state detection means detects that said apparatus is in the talk mode and when said key operation state detection circuit detects that said power source key has been operated.

10. A method of controlling a radio telephone apparatus having a transceiver unit including a power supply and a radio circuit, said method comprising the steps of:
    turning ON said apparatus by operating an ON/OFF key, wherein said apparatus is turned ON solely in response to an actuation of said ON/OFF key;
    detecting whether or not said apparatus is in a talk mode on the basis of the detection of a supervisory audio tone signal transmitted by a base station;
    detecting whether or not a switching operation has been performed to turn OFF said power supply; and
    inhibiting OFF operation of the power supply when the apparatus is in said talk mode even when a switching operation is performed to turn OFF the power supply.

11. A method as set forth in claim 10, wherein said inhibiting OFF operation step is carried out by inhibiting OFF operation of a power source line switch disposed in a power supply line leading to said power supply.

12. A method as set forth in claim 10, further comprising the step of performing a muting operation when it is detected that said apparatus is in the talk mode and a switching operation to turn OFF said power supply has been performed.

13. A method as set forth in claim 10, further comprising the step of performing a volume adjusting operation when it is detected that said apparatus is in the talk mode and a switching operation to turn OFF said power supply has been performed.

14. A radio telephone apparatus having a radio circuit, comprising:
    a power supply;
    a power source line switch for supplying a voltage from a power source to said power supply;
    a power source switch for turning OFF said power supply and for turning ON said power supply solely in response to an actuation of said power source switch;
    first detection means for detecting an ON or OFF state of said power source switch;
    second detection means for detecting whether or not said apparatus is in a talk mode on the basis of the establishment of a speech radio channel by said radio circuit; and
    control means for inhibiting switching of said power source line switch to its OFF state by means of said power source switch in said talk mode and for allowing switching of the power source line switch to the OFF state only in a non-talk mode on the basis of detection signals received from said first and second detection means.

15. A radio telephone apparatus, comprising:
    a power supply;
    a transceiver unit for establishing a talk path through a radio link between said transceiver unit and a base station;
    a control unit connected to said transceiver unit through a wire line and having a receiver, a transmitter and a keypad, wherein an ON/OFF function of said power supply and a muting function which mutes a transmitted voice, are allocated to one key in said keypad which turns ON said power supply, and wherein said power supply is turned ON solely in response to an actuation of said one key;
    first detection means for detecting an ON or OFF state of said one key;
    second detection means for detecting whether said apparatus is in a talk mode or a non-talk mode through said radio link on the basis of the establishment of a speech radio channel by said radio circuit; and
    control means for performing said muting function when an ON or OFF output of said one key is detected by said first detecting means and said apparatus is in said talk mode, and for performing said ON/OFF function of said power supply when said apparatus is in a non-talk mode.

16. A radio telephone apparatus, comprising:
    power supply means for supplying the apparatus with electric power;
    an operator-actuatable switch;
    detection means for detecting an actuation of said operator-actuatable switch and for generating a detection signal in response to the detection of the actuation, wherein said power supply means is turned ON solely in response to the actuation of said operator-actuatable switch;

establishing means for establishing a speech communication link with another apparatus over one or more radio channels; and power supply control means, responsive to the detection signal, for controlling the power supply means so that power supplied to the apparatus is initiated or terminated in response to the detection signal when the speech communication link is not established by said establishing means and so that power supplied to the apparatus is not terminated in response to said detection signal when the speech communication link is established by said establishing means.

17. The apparatus of claim 16, further comprising control means for performing a function other than supplying power in response to said detection signal while the speech communication link is established by said establishing means.

18. The apparatus of claim 17, further comprising:
audio input means for processing input audio signals; and
broadcasting means for broadcasting signals applied thereto through the speech communication link,
wherein said control means prevents said audio input means from processing said input audio signals in response to said detection signal while the speech communication link is established by said establishing means.

19. The apparatus of claim 17, further comprising:
audio input means for processing input audio signals; and
broadcasting means for broadcasting signals applied thereto through the speech communication link,
wherein said control means controls the magnitude of signals to be transmitted from said audio input means to said broadcasting means in response to said detection signal while the speech communication link is established by said establishing means.

20. The apparatus of claim 16 wherein said operator-actuatable switch comprises a depressible key switch and means for detecting the actuation of said operator-actuatable switch when the depressible key switch is continuously depressed for a predetermined time period.

21. A radio telephone apparatus, comprising:
power supply means for supplying the apparatus with electric power;
an operator-actuatable switch; wherein said power supply means is turned ON solely in response to the actuation of said operator-actuatable switch
establishing means for establishing a speech communication link with another party;
power supply control means for controlling the power supply means so that power supplied to the apparatus is initiated or terminated in response to the actuation of said operator-actuatable switch when the speech communication link is not established by said establishing means, and so that the power supplied to the apparatus is not terminated in response to the actuation of said operator-actuatable switch while the speech communication link is established by said establishing means.

22. The apparatus of claim 21, further comprising:
audio input means for processing input audio signals;
broadcasting means for broadcasting signals applied thereto through the speech communication link; and
control means for preventing said audio input means from processing the input audio signals in response to an actuation of said operator-actuatable switch while the speech communication link is established by said establishing means.

23. The apparatus of claim 21, further comprising:
audio input means for processing input radio signals;
broadcasting means for broadcasting signals applied thereto through the speech communication link; and
control means for controlling the magnitude of signals to be transmitted from said audio input means to said broadcasting means in response to the actuation of said operator-actuatable switch while the speech communication link is established by said establishing means.

24. A radio telephone apparatus, comprising:
an operator-actuatable switch;
power supply means for supplying the apparatus with electric power in response to an actuation of said operator-actuatable switch, wherein the power supplied to the apparatus is initiated solely in response to an actuation of said operator-actuatable switch;
determining means for determining if a speech communication link is established between the radio telephone apparatus and another apparatus;
audio input means for processing input audio signals;
broadcasting means for broadcasting signals applied thereto through the speech communication link; and
control means, responsive to an actuation of said operator-actuatable switch, for continuing the power supply to the apparatus and controlling the magnitude of signals to be transmitted between said audio input means and said broadcasting means if the speech communication link is established.

25. The apparatus of claim 24, wherein said control means disconnects said audio input means from said broadcasting means in response to the actuation of said operator-actuatable switch if the speech communication link is established, whereby said operator-actuatable switch is used as a mute switch while the speech communication link is established.

26. The apparatus of claim 24, wherein said control means increases or decreases a volume level of signals to be transmitted from said audio input means to said broadcasting means in response to the actuation of said operator-actuatable switch if the speech communication link is established, whereby said operatoractuatable switch is used as a volume switch while the speech communication link is established.

27. The apparatus of claim 24, wherein said determining means determines that a speech communication link is established between the radio telephone apparatus and another apparatus when a tone signal of a predetermined frequency is received through the speech communication link.

28. A radio telephone apparatus, comprising:
an operator-actuatable switch;
power supply means for supplying the apparatus with electric power responsive to an actuation of said operator-actuatable switch, wherein the power supplied to the apparatus is initiated solely in response to an actuation of said operator-actuatable switch;

determining means for determining if a speech communication link is established between the radio telephone apparatus and another apparatus; and control means, responsive to an actuation of said operator-actuatable switch, for continuing the power supply of the apparatus and performing a function other than supplying the apparatus with electric power if the speech communication link is established.

29. The apparatus of claim 28, further comprising:

audio input means for processing input audio signals; and broadcasting means for broadcasting signals applied thereto through the speech communication link, wherein said control means disconnects said audio input means from said broadcasting means in response to the actuation of said operator-actuatable switch if the speech communication link is established, whereby said operator-actuatable switch is used as a mute switch while the speech communication link is established.

30. The apparatus of claim 28, further comprising:

audio input means for processing input audio signals; and broadcasting means for broadcasting signals applied thereto through the speech communication link, wherein said control means increases or decreases a volume level of signals to be transmitted from said audio input means to said broadcasting means in response to the actuation of said operator-actuatable switch if the speech communication link is established, whereby said operator-actuatable switch is used as a volume switch while the speech communication link is established.

31. The apparatus of claim 28, wherein said determining means determines that a speech communication link is established between the radio telephone apparatus and another apparatus when a tone signal of a predetermined frequency is received through the speech communication link.

32. A method of using an operator-actuatable switch provided in a radio telephone apparatus both as a power switch and a volume control switch, comprising the steps of:

(a) supplying the apparatus with electric power in response to an actuation of said operator-actuatable switch, wherein the power supplied to the apparatus is initiated solely in response to an actuation of said operator-actuatable switch;

(b) determining if a speech communication link is established between the radio telephone apparatus and another apparatus; and (c) continuing the power supply to the apparatus and controlling the magnitude of signals to be transmitted between an audio input means and a broadcasting means in response to an actuation of said operator-actuatable switch if the speech communication link is established.

33. The method of claim 32, wherein the continuing step comprises a step of disconnecting said audio input means from said broadcasting means in response to the actuation of said operator-actuatable switch if the speech communication link is established, whereby said operator-actuatable switch is used as a mute switch while the speech communication link is established.

34. The method of claim 32, wherein the continuing step comprises a step of increasing or decreasing a volume level of signals to be transmitted from said audio input means to said broadcasting means in response to the actuation of said operator-actuatable switch if the speech communication link is established, whereby said operator-actuatable switch is used as a volume switch while the speech communication link is established.

35. The method of claim 32, wherein the determining step comprises a step of detecting a tone signal of a predetermined frequency in signals received through the speech communication link.

36. A method of using an operator-actuatable switch provided in a radio telephone apparatus both as a power switch and another function switch, comprising the steps of:

(a) supplying the apparatus with electric power responsive to an actuation of said operator-actuatable switch, wherein the power supplied to the apparatus is initiated solely in response to an actuation of said operator-actuatable switch;

(b) determining if a speech communication link is established between the radio telephone apparatus and another apparatus; and (c) continuing the power supply to the apparatus and performing a function other than supplying the apparatus with electric power in response to an actuation of said operator-actuatable switch if the speech communication link is established.

37. The method of claim 36, wherein the continuing step comprises a step of disconnecting an audio input means from a broadcasting means in response to the actuation of said operator-actuatable switch if the speech communication link is established, whereby said operator-actuatable switch is used as a mute switch while the speech communication link is established.

38. The method of claim 36, wherein the continuing step comprises a step of increasing or decreasing a volume level of signals to be transmitted from an audio input means to a broadcasting means in response to the actuation of said operator-actuatable switch if the speech communication link is established, whereby said operator-actuatable switch is used as a volume switch while the speech communication link is established.

39. The method of claim 36, wherein the determining step comprises a step of detecting a tone signal of a predetermined frequency out of signals received through the speech communications link.

40. A method of controlling a radio telephone apparatus having a transceiver unit including a power supply and a ratio circuit, said method comprising the steps of:

turning ON said apparatus by operating an ON/OFF key, wherein said apparatus is turned ON solely in response to an actuation of said ON/OFF key;

detecting whether or not the apparatus is in a talk mode on the basis of the establishment of a speech radio channel by said radio circuit;

inhibiting an OFF operation of said power supply when the apparatus is in the talk mode; and detecting whether or not a switching operation has been performed to turn OFF said power supply, wherein said inhibiting step is carried out by inhibiting the OFF operation of said power supply so long as the apparatus is in the talk mode even when a switching operation has been performed to turn OFF the power supply.

41. A method as set forth in claim 40, wherein said talk mode detecting step is carried out by detecting whether or not the apparatus is in the talk mode on the basis of an output of said radio circuit.

42. A method as set forth in claim 40, wherein said talk mode detecting step is carried out by detecting whether or not the apparatus is in the talk mode on the basis of a stage in a control step of said transceiver unit.

43. A method as set forth in claim 40, wherein said inhibiting step is carried out by inhibiting the OFF operation of a power source link switch disposed in a power supply line leading to said power supply.

* * * * *